Jan. 2, 1968 G. W. CORNELIUS 3,360,927
AFTERBURNER SYSTEM FOR AN AUTOMOTIVE VEHICLE
Filed Feb. 4, 1964 7 Sheets-Sheet 4

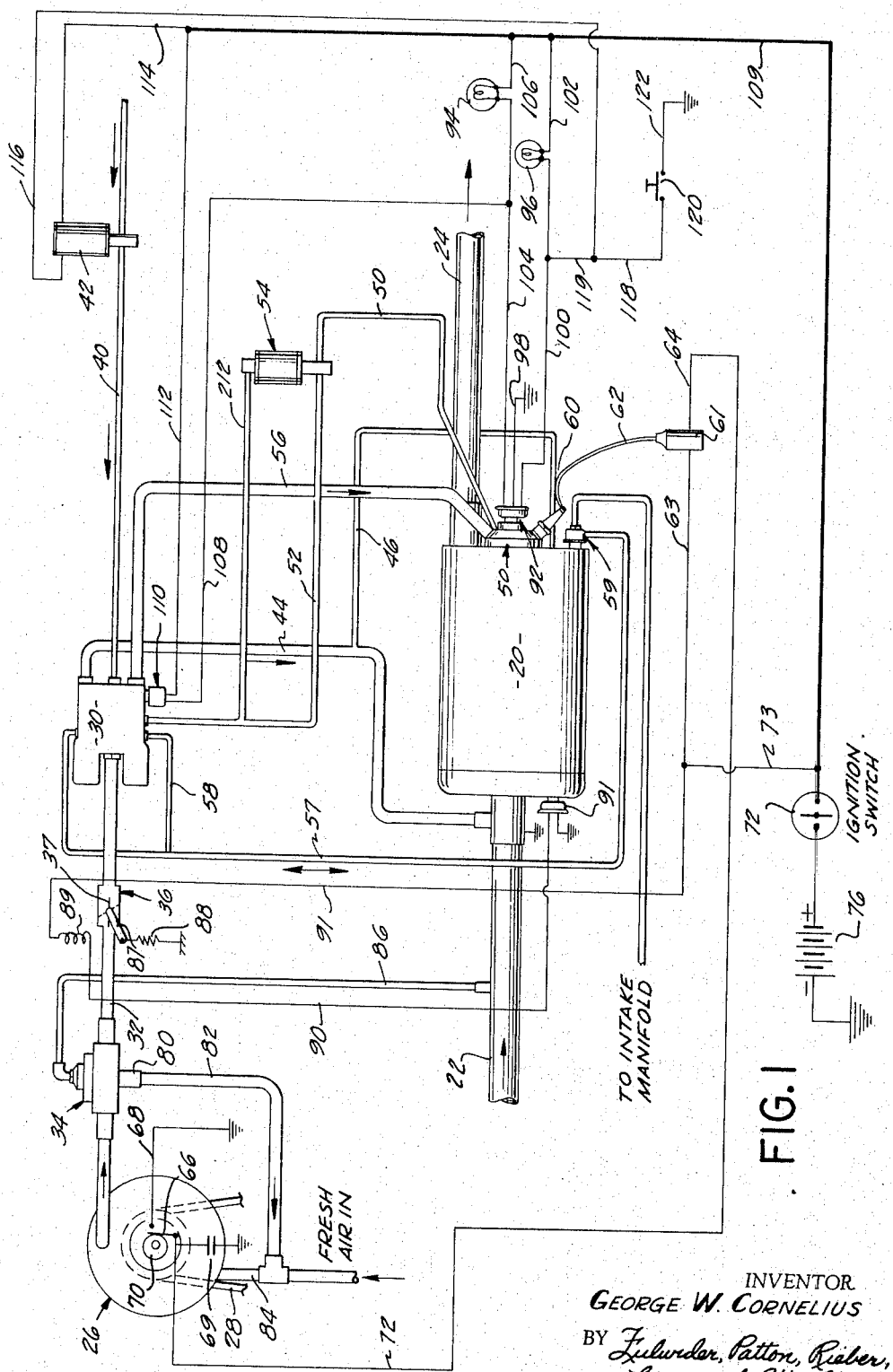

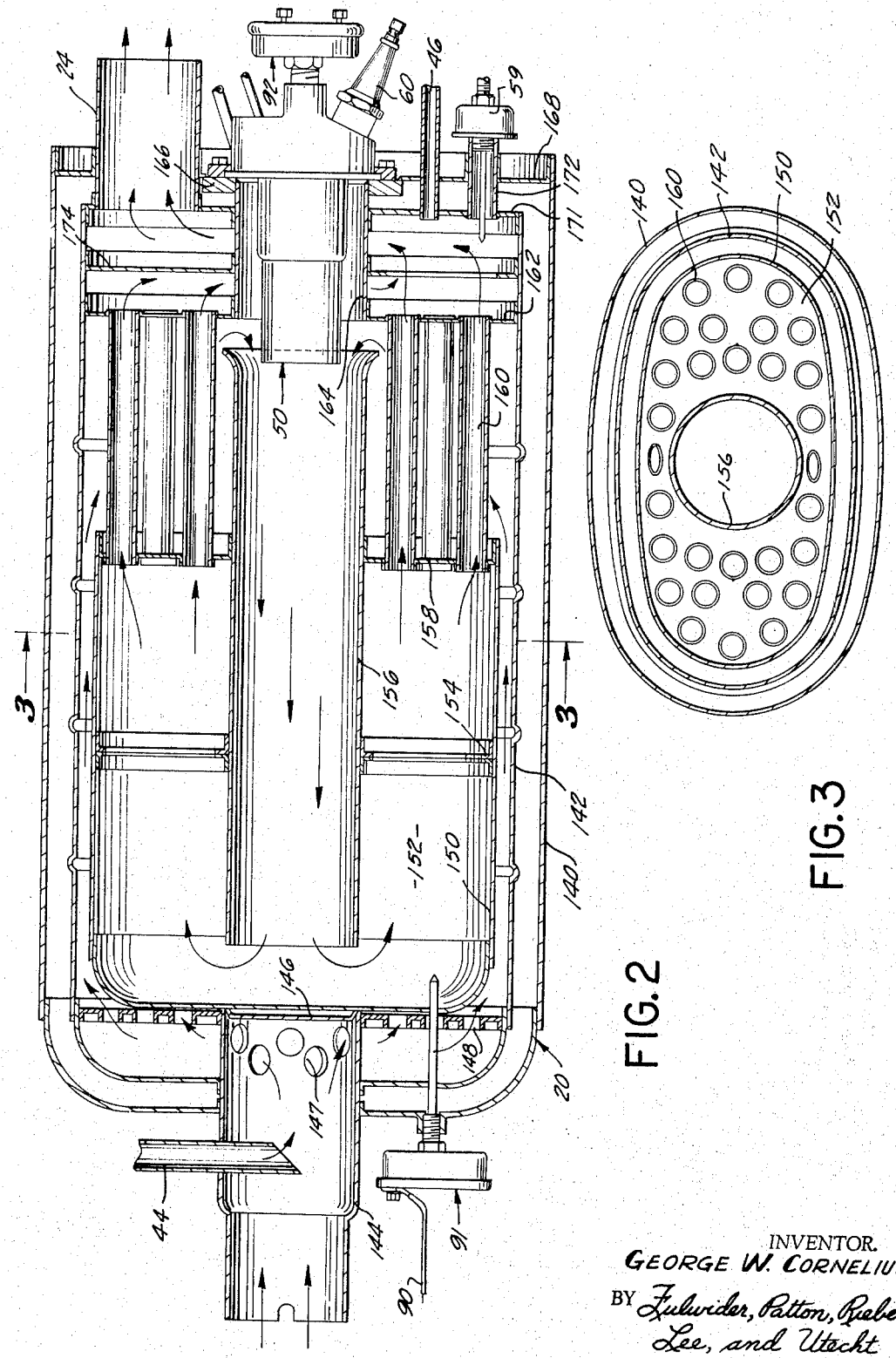

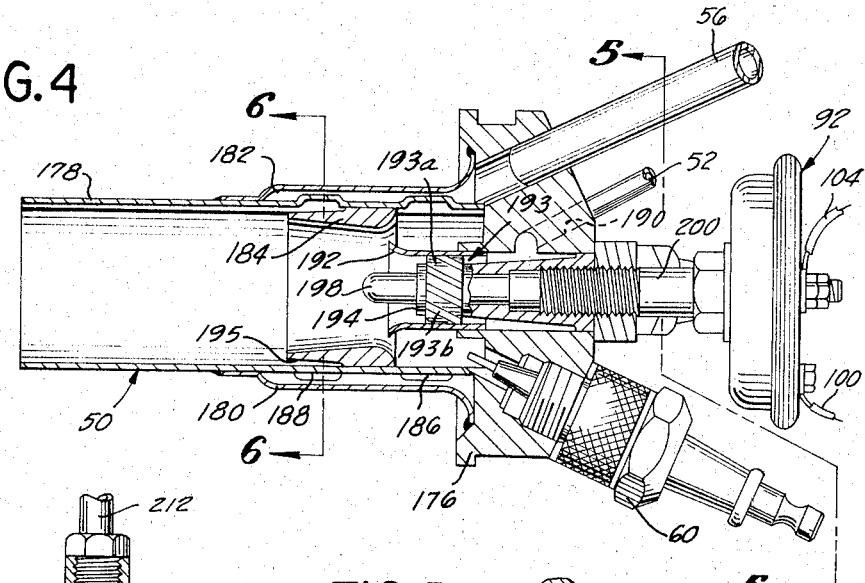
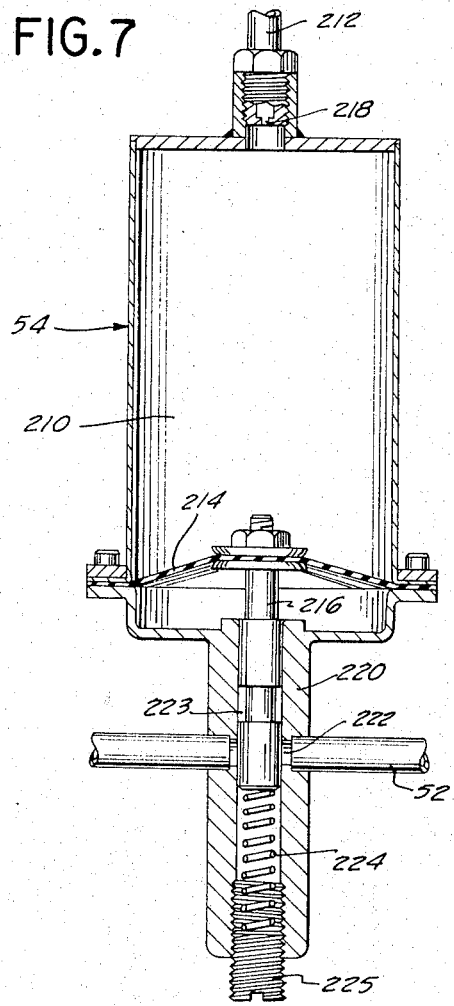
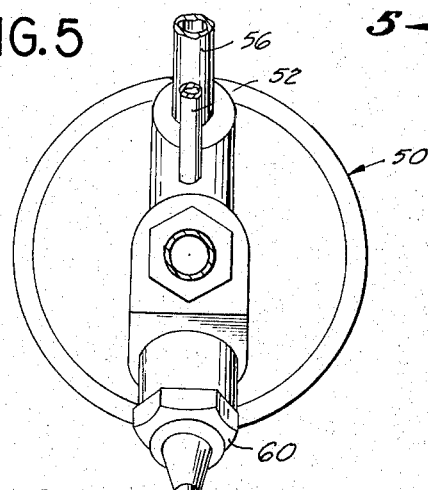
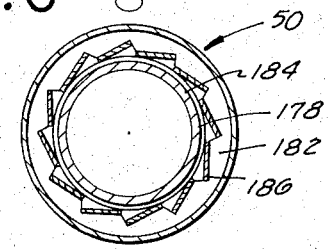

INVENTOR.
GEORGE W. CORNELIUS
BY Fulwider, Patton, Rieber,
Lee and Utecht
ATTORNEYS Jan. 2, 1968 G. W. CORNELIUS 3,360,927
AFTERBURNER SYSTEM FOR AN AUTOMOTIVE VEHICLE
Filed Feb. 4, 1964 7 Sheets-Sheet 5
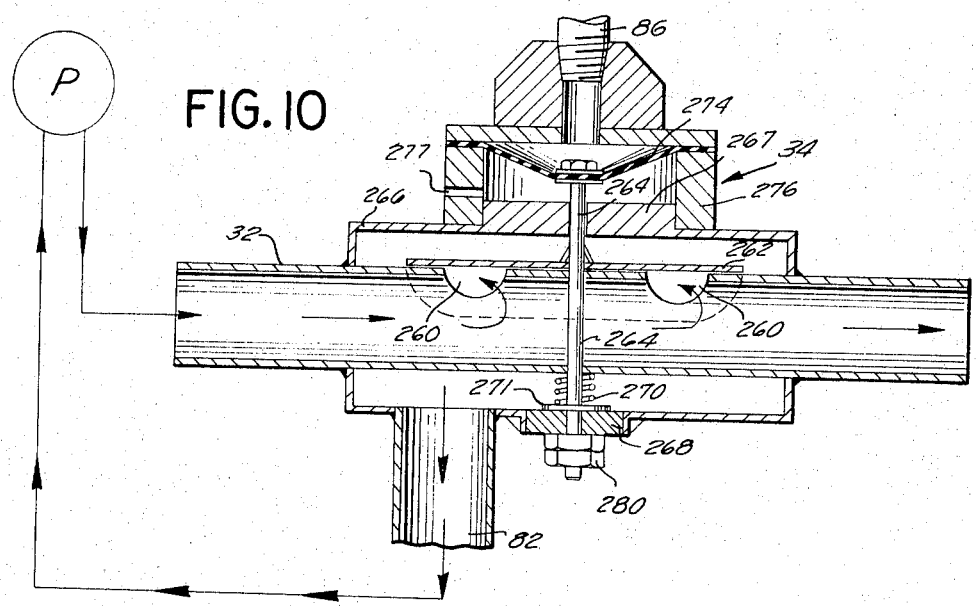
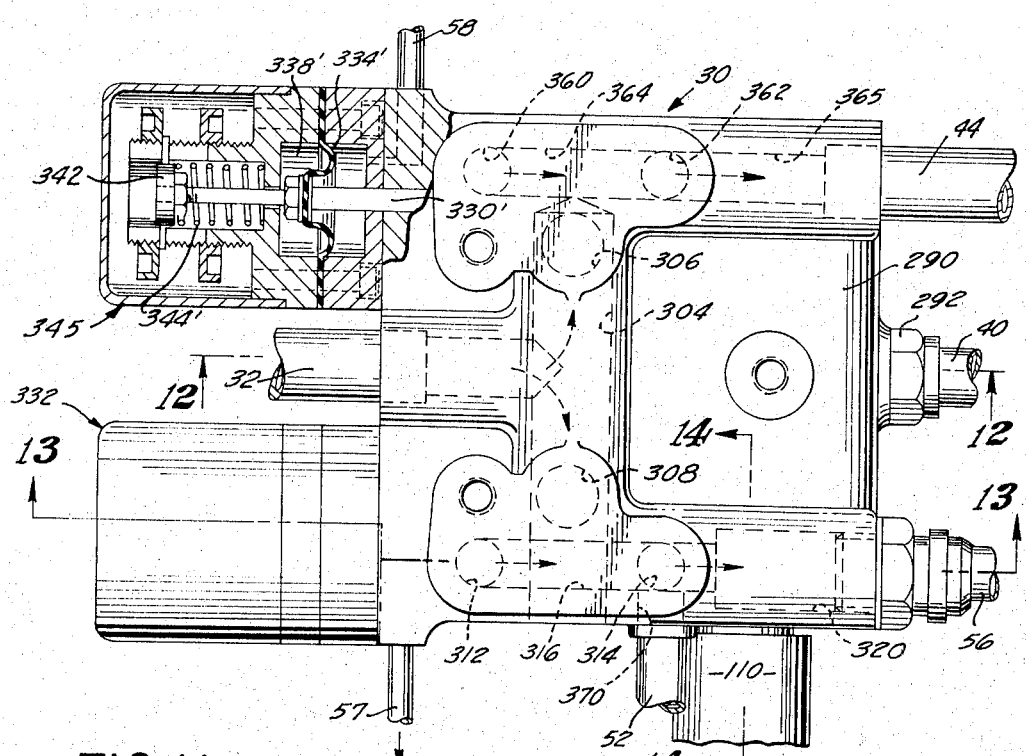
INVENTOR.
GEORGE W. CORNELIUS
BY Fulwider, Patton, Rieber,
Lee, and Utecht
ATTORNEYS Jan. 2, 1968   G. W. CORNELIUS   3,360,927
AFTERBURNER SYSTEM FOR AN AUTOMOTIVE VEHICLE
Filed Feb. 4, 1964   7 Sheets-Sheet 6

INVENTOR.
GEORGE W. CORNELIUS
BY Fulwider, Patton, Rieber,
Lee, and Utecht
ATTORNEYS Jan. 2, 1968    G. W. CORNELIUS    3,360,927
AFTERBURNER SYSTEM FOR AN AUTOMOTIVE VEHICLE
Filed Feb. 4, 1964    7 Sheets-Sheet 7
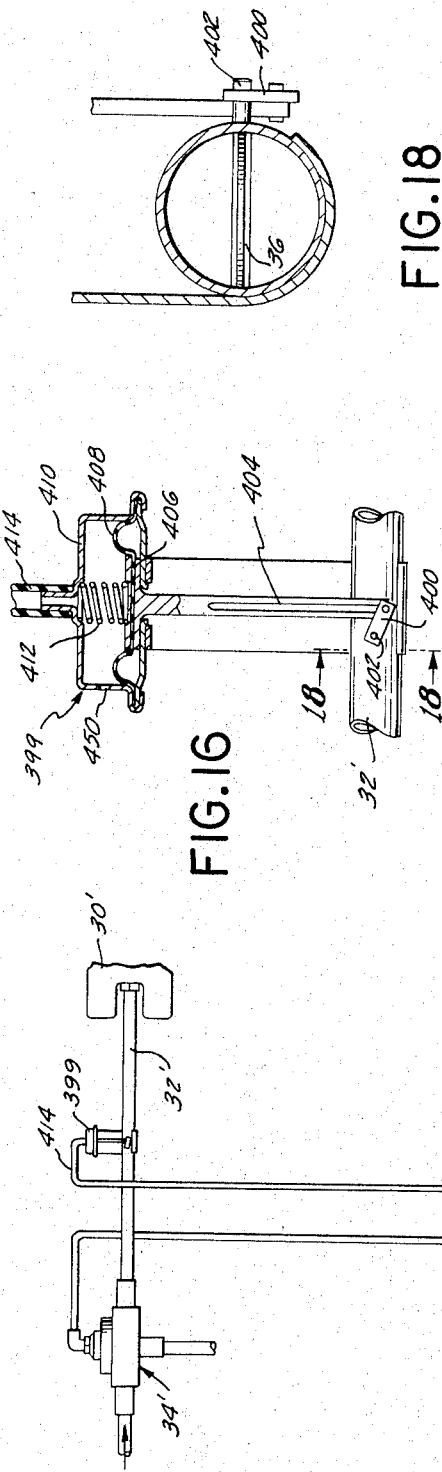
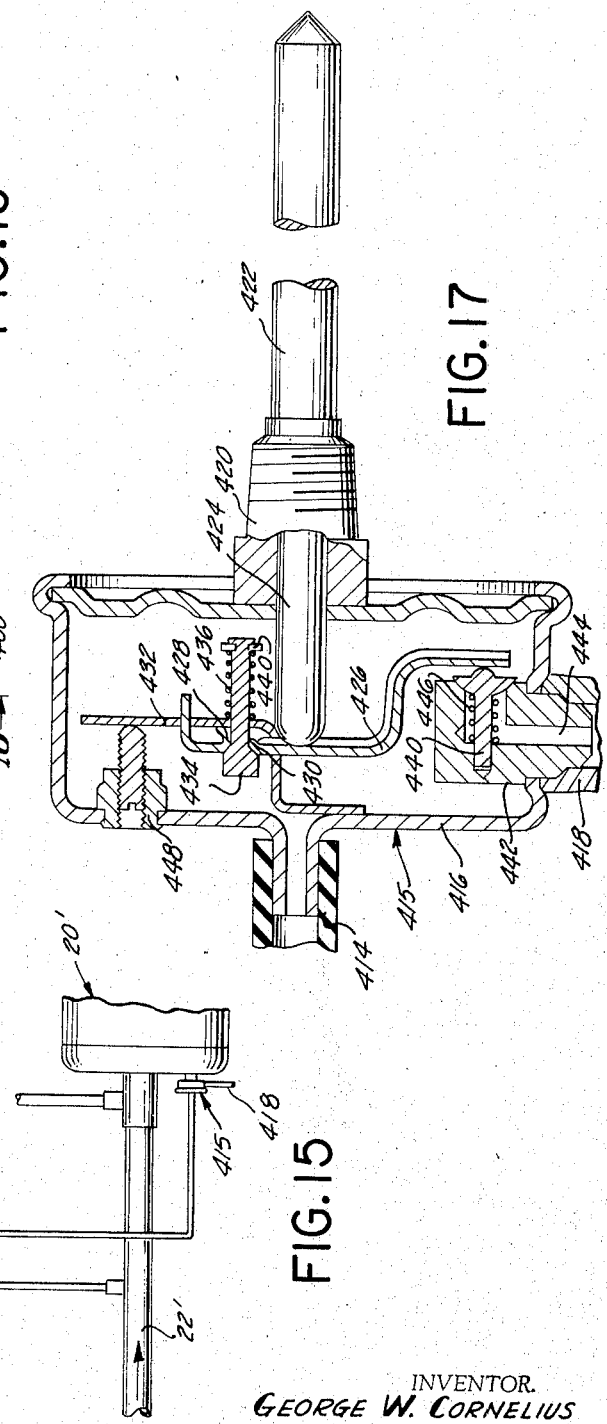
INVENTOR.
GEORGE W. CORNELIUS
BY Fulwider, Patton, Rieber, Lee, and Utecht
ATTORNEYS

United States Patent Office 3,360,927
Patented Jan. 2, 1968

3,360,927
AFTERBURNER SYSTEM FOR AN AUTOMOTIVE VEHICLE
George W. Cornelius, Palos Verdes, Calif., assignor to Holley Carburetor Company, Warren, Mich.
Filed Feb. 4, 1964, Ser. No. 342,868
11 Claims. (Cl. 60—30)

The present invention relates generally to the field of automotive vehicles, and more particularly to an afterburner system for treating the exhaust gases issuing from the internal combustion engine of an automotive vehicle. This system is an improvement over the afterburner system shown in my Patent No. 2,851,852, issued Sept. 16, 1958.

The unburned products of combustion exhausted from the internal combustion engines of automotive vehicles constitute a prime source of the so-called "smog" which exists in and around the principal population centers of the country. The harmful effects of this smog upon both animate and inanimate objects are very well known. While many forms of afterburner apparatus for treating these unburned products of combustion have been heretofore proposed, such devices have for various reasons proven to be unsatisfactory and none have been approved for general usage.

It is a major object of the present invention to provide a novel and improved afterburner system for treating the exhaust gases issuing from the internal combustion engine of an automotive vehicle.

Another object of the invention is to provide an afterburner system of the afore-described nature that is foolproof and entirely automatic in operation.

A further object of the present invention is to provide an afterburner system of the afore-described nature that may be readily installed upon the engine of any conventional automotive vehicle.

Yet another object of the present invention is to provide an afterburner system for an automotive vehicle which will be sufficiently economical of construction as to permit wide usage.

Yet another object of the present invention is to provide an afterburner system for an automotive vehicle which includes an afterburner, an air pump actuated by the engine of the automotive vehicle, a fuel supply means, a carburetor that receives air from the air pump and fuel from the fuel supply means and delivers such air and fuel under pressure to the afterburner, with automatic control means being provided whereby such air and fuel will be delivered in the proper mixtures and volumes to provide the most efficient operation of the afterburner during all operating conditions of the engine powering said vehicle.

An additional object of the present invention is to provide an afterburner system of the type described immediately hereinabove wherein means are provided to control the air and fuel mixture entering the afterburner responsive to the temperature within the afterburner.

Yet a further object of the present invention is to provide an afterburner system of the afore-described nature utilizing a unique air pump which is so constructed as to permit it to continue to supply air to the carburetor when the automotive vehicle undergoes rapid deceleration so as to thereby obtain maximum burning efficiency within the afterburner housing.

It is an important object of the present invention to provide an afterburner system for an automotive vehicle that incorporates interior and exterior signal lamps to indicate both to the operator of the vehicle and to governmental authorities whether or not the system is properly functioning.

Another object of the present invention is to provide an afterburner system utilizing an afterburner housing wherein a mixture of exhaust gases and air are caused to flow through a flame tube that is provided with a pilot burner whereby said mixture is ignited within the flame tube, with the resultant products of combustion being in heat-transfer relationship with the walls of the housing over which the mixture of exhaust gases and air must flow so as to enter the flame tube.

These and other objects and advantages of the present invention will become apparent from the following detailed description, when taken in conjunction with the appended drawings wherein:

FIGURE 1 is a diagrammatic view showing a preferred form of afterburner system embodying the present invention;

FIGURE 2 is a side elevational view taken partly in central vertical cross-section and in enlarged scale relative to FIGURE 1, showing an afterburner housing employed with said afterburner system;

FIGURE 3 is a vertical sectional view taken along line 3—3 of FIGURE 2;

FIGURE 4 is a side elevational view taken partially in central vertical cross-section and in further enlarged scale showing a pilot burner that is mounted at the rear portion of the afterburner housing of FIGURE 2;

FIGURE 5 is a rear elevational view of said pilot burner;

FIGURE 6 is a vertical sectional view taken along line 6—6 of FIGURE 4;

FIGURE 7 is a central vertical cross-sectional view showing a timer member utilized in the afterburner system of FIGURE 1;

FIGURE 10 is a vertical sectional view in enlarged scale showing an air pressure regulator valve utilized with the afterburner system of FIGURE 1;

FIGURE 11 is a top plan view in enlarged scale and taken partly in horizontal section showing a carburetor utilized with the afterburner system of FIGURE 1;

FIGURE 15 is a fragmentary side elevational view showing a second form of air safety shut-off valve arrangement which may be utilized with the present invention;

FIGURE 16 is a fragmentary side elevational view in enlarged scale and taken partly in central vertical section of an actuator member for the air safety shut-off valve arrangement of FIGURE 15;

FIGURE 17 is a side view taken partly in central vertical section and in further enlarged scale showing a temperature-sensing unit of the air safety shut-off valve arrangement of FIGURE 15; and FIGURE 18 is a vertical sectional view taken in enlarged scale along lines 18—18 of FIGURE 16.

*General arrangement*

Figure 8:
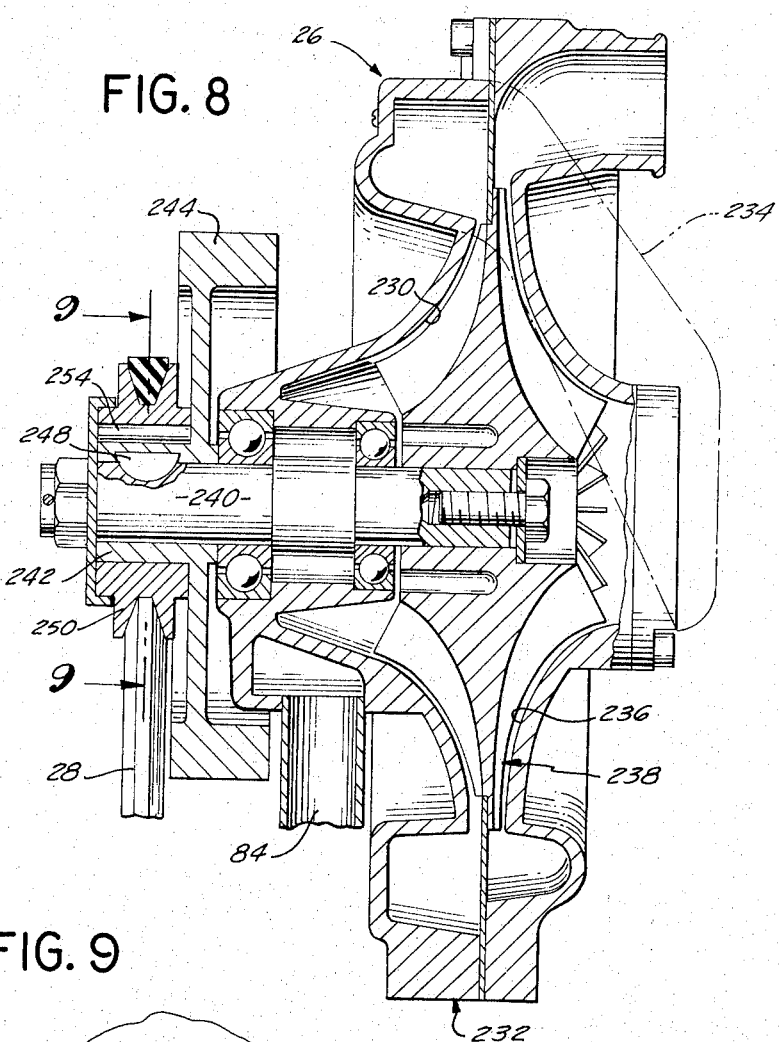
FIGURE 8 is a central vertical sectional view in enlarged scale showing an air pump utilized with the afterburner system of FIGURE 1.

Referring to the drawings and particularly FIG. 1 thereof, a preferred embodiment of the present invention includes a direct flame burner-type afterburner, generally designated 20, having its front end in communication with the exhaust line 22 from the internal combustion engine of an automotive vehicle. The rear end of the afterburner 20 is in communication with a conventional tail pipe 24.

An air pump or blower, generally designated 26, is driven by the internal combustion engine through a belt 28 in a conventional manner. The discharge of this air pump 26 is in communication with the front end of a carburetor 30 by means of an air line 32. An air pressure regulator valve, generally designated 34, and an air safety shut-off valve, generally designated 36 are disposed in the air line 32 for a purpose to be set forth hereinafter. The carburetor 30 receives gasoline or other fuel by means of a fuel line 40 from the fuel pump (not shown) of the internal combustion engine.

A conventional normally closed electric solenoid-type shut-off valve 42 is disposed in the fuel line 40 for a purpose to be set forth hereinafter. The carburetor 30 directs pressurized air to the upstream end of the afterburner 20 by means of an upstream air conduit 44. Fresh air is also directed from the carburetor 30 to the downstream end of the afterburner 20 by means of a downstream air branch 46 that extends from conduit 44. The rear end of the afterburner 20 is provided with a pilot burner, generally designated 50. A conduit 52 directs fresh air from the carburetor 30 to the pilot burner 50. A time-delay valve, generally designated 54, controls the flow of air through the conduit 52 in a manner to be set forth hereinafter. The carburetor directs a mixture of air and fuel to the pilot burner 50 through a conduit 56. A vacuum line 57 and branch 58 connects the carburetor 30 with the intake manifold of the internal combustion engine, with a temperature-responsive valve 59 being interposed in the vacuum line 57, the latter valve being secured to the rear end of the afterburner 20. Valve 59 is of conventional construction and serves to block flow through conduit 57 until such time as the temperature within the rear portion of the afterburner 20 exceeds a predetermined magnitude.

The afterburner 20 is provided with a conventional spark plug 60. The base of the spark plug 60 is grounded to the afterburner, while the terminal post thereof is connected to a conventional spark coil 61 by a high tension lead 62. One side of this coil 61 is connected to a positive lead 63, while the other side thereof is connected by a lead 64 to the arm 66 of a breaker point unit mounted on the air pump 26. The arm 66 of the breaker point unit is actuated by means of a cam 70 that is keyed to the shaft of the air pump 26. The fixed contact 67 of the breaker point unit is connected by a lead 68 to ground. A capacitor 69 may be interposed between arm 66 and ground. The positive lead 63 is connected to the igniting switch 72 of the automotive vehicle by a branch lead 73. With this arrangement, rotation of the air pump 26 will effect sparking of the spark plug 60.

The air pressure regulator valve 34 is adapted to control the maximum pressure of the air entering the carburetor 30. This regulator valve is provided with an outlet 80 that is in communication with a branch air line 82 that leads to the air inlet pipe 84 for the air pump 26. Alternatively, the outlet 80 may be in direct communication with the atmosphere. Opening and closing of the air pressure regulator valve 34 is responsive to the pressure of the exhaust gases, with communication between the exhaust line 22 and the air pressure regulator valve being effected by means of a conduit 86.

The safety shut-off valve 36 includes a butterfly element 37 that operates to block the flow of air into the carburetor 30 should the temperature within the afterburner 20 rise above a predetermined value. The value element 37 is affixed to a control arm 87 that is normally biased to an open position by a spring 88. The control arm 87 is caused to move clockwise so as to close valve element 37 by a conventional solenoid 89. To this end, one side of the windings of the solenoid 89 of said valve is connected by a lead 90 to a heat-responsive switch 91 secured to the front of the afterburner 20. The other side of this switch 91 is grounded. The opposite side of the solenoid windings is connected to the ignition switch 72 by a lead 91a and branch lead 73.

A second heat-responsive switch, generally designated 92, is secured to the rear end of the pilot burner 50. This temperature-responsive switch is in circuit with a dashboard-located signal lamp 94 and with an exterior indicating lamp 96.

The second heat-responsive switch 92 is of conventional construction. It is grounded by its connection to the afterburner 20, as represented by lead 98. A lead 100 connects this switch to one side of the filaments of the exterior signal lamp 96. The other side of such filaments are connected to the positive lead 74 by a lead 102. The switch 92 is connected by a lead 104 to one side of the filaments of the dashboard-located lamp 94. It is contemplated that the exterior signal lamp 96 will, when illuminated, provide an indication to those authorities enforcing anti-polution laws that the afterburner 20 is functioning properly, while the dashboard-located lamp 94 will, when illuminated, provide this information to the motorist. The opposite side of such filaments are connected to the positive lead 74 by a lead 106. The lead 104 is connected by a lead 108 to a priming valve, generally designated 110, which is operatively secured to the carburetor 30. The latter valve is also connected to a lead 112 which in turn is connected with a positive lead 109 connected to ignition switch 72. The positive lead 109 is connected to one side of the windings of the fuel shut-off valve 42 by a lead 114. The opposite side of the windings of this solenoid are connected to a ground lead 116. This ground lead 116 is connected at its opposite end to a push button lead 118, with the latter also being connected to the afore-described lead 100 by a short branch lead 119. A conventional push button switch 120 has one side connected to the push button lead 118. This push button switch 120 is normally biased open. When it is depressed its opposite side is grounded through a ground lead 122.

*The afterburner 20*

Referring particularly to FIGS. 2 and 3, there are shown the details of the afterburner 20. The afterburner 20 includes an outer housing 140 and an inner housing 142 concentrically inwardly disposed within the outer housing 140. A forwardly projecting neck 144 is provided at the front end of the inner and outer housing, with the rear end of such neck being affixed to a front bulkhead 146. The front end of the neck 144 is secured to the exhaust line 22. The lower end of the upstream air line 44 is secured to the neck 144. A plurality of apertures 147 are formed in the rear portion of the neck 144 within the interior of the front portion of the inner housing 142. The bulkhead 146 is provided with inlet ports 148 to receive the homogeneous mixture of exhaust gases and upstream air entering the neck through the exhaust line 22 and the upstream air line 44.

This mixture passes through the inlet ports 148 along the outer surface of a cylinder 150 supported concentrically inwardly of the inner housing 142 so as to define a burning chamber 152. The intermediate portion of the cylinder 150 supports an apertured bulkhead 154 which in turn is affixed to the intermediate portion of a longitudinally extending flame barrel 156. Another bulkhead 158 is mounted at the rear end of the cylinder 150. The bulkhead 158 supports the front end of a plurality of heat exchange tubes 160 that are supported by yet another bulkhead 162. The bulkhead 162 supports the front end of a collar 164 having its rear end affixed to a flange 166. The latter is welded to a rear closure 168. The pilot burner 50 is secured to the flange 166 and extends forwardly through the collar 164. The rear end of the inner casing 142 is secured to a rear bulkhead 171. The tail pipe 24 is secured to the upper portion of this rear bulkhead 171. A short tube 172 is secured to the lower portion of bulkhead 171 to mount the heat-sensitive valve 59.

As the mixture of exhaust gases and air passes over the exterior of the cylinder 150 they are in heat transfer relationship therewith so as to be preheated. After passing over the rear portion of the cylinder 150 these gases are directed radially inwardly over the outer surfaces of the head exchange tubes 160, such gases being confined between bulkheads 158 and 162. As the gases move radially inwardly, they will enter the rear end of the flame barrel 156, as indicated by the directional arrows in FIG. 2. The burning gases then flow forwardly through the flame barrel 156 and at the front end thereof reverse their direction of flow so as to pass rearwardly through the burning chamber 152 and then rearwardly through the heat exchange tubes 160. Since flame encompasses the interior and exterior of the flame barrel 156 no quenching will occur. The gases from the rear of the flame barrel 156 flow around the collar 164 and out of the afterburner through the tail pipe 24. It will be noted that preferably a baffle 174 is provided at the rear of the afterburner to direct the gases from the upper portion thereof downwardly around collar 164.

As the gases enter the rear end of the flame barrel 156 they will be ignited by a highly oxidizing flame provided by the pilot burner 50. The flame barrel 156 will have been preheated by the gases within the burning chamber 152 so as to eliminate any flame quenching action from taking place within the flame barrel. Preferably, the space between the outer housing 140 and the inner housing 142 will be filled with a suitable heat insulating material (not shown). Also the exterior surface of the inner housing 142 will be wrapped with a highly reflective material (not shown), such as aluminum foil, with the bright side of such foil facing inwardly. The interior surface of the outer housing 140 may also be wrapped with a highly reflecting material (not shown), with the bright side of such material facing inwardly.

Referring now to FIGS. 4 and 5, the pilot burner 50 includes a mounting body 176 that is bolted to the flange 166 of the afterburner rear closure 168. A frame tube 178 extends forwardly from the body 176. A shroud 180 extends forwardly from the body 176 to the intermediate portion of the flame tube 178 and radially outwardly of the latter so as to define a chamber 182 that is in communication with the air-fuel conduit 56. A venturi nozzle 184 is disposed within the flame tube 178 and louvers, such as 186, connect the interior of the flame tube 178 rearwardly of the venturi nozzle 184 with the chamber 182. Similar louvers 188 connect the interior of the tube 178 with the chamber 182 at a point spaced radially outwardly of the front portion of the venturi nozzle 184. Fresh air is conducted from the conduit 52 to the interior of the venturi nozzle 184 by means of a passage 190 defined in the body 176 and a guide shroud 192 that extends forwardly from the body 176. This air is given a spiral motion by means of a spinner element 193. This element 193 includes a hub 193a that is fixed in place and is formed with a plurality of inclined passages 193b. A forwardly tapering support 194 for the heat-sensitive switch 92 extends from the rear portion of the body 176 forwardly within the guide shroud 192. This element 194 is centrally apertured to receive the heat-sensing tube 198 of the heat-sensitive switch 92, with the rear portion of the central aperture being threaded to receive the threaded housing 200 of this switch.

The spark plug 60 is disposed within the rear portion of the flame tube 178 behind the venturi nozzle 184 whereby it may effect ignition of the air-fuel mixture jetting from the louvers 186. The resultant ignited gases jet forwardly through the venturi nozzle 184 in a spiraling pattern so as to heat the flame tube 178 to the necessary temperature. It should be particularly noted that the outer front portion of the venturi nozzle 184 tapers radially inwardly towards the front of this nozzle, as indicated at 195. This arrangement assists in providing this jetting effect of the ignited gases.

Referring now to FIGURE 7, the time delay valve 54 includes a housing 210 having its upper end in communication with a conduit 212 that is connected to the secondary air conduit 52, as shown in FIGURE 1. A flexible diaphragm 214 is positioned within the lower portion of the housing 210, with the center thereof being secured to a valve stem 216. A metering orifice 218 is interposed between the upper portion of the housing interior and the conduit 212. The lower portion of the housing 210 is provided with a depending neck 220 wherein the valve stem 216 is vertically slidably mounted. A horizontal passage 222 formed in the neck 220 serves to effect communication through the secondary air conduit 52 when the groove 223 of the valve stem 216 is urged downwardly from its position of FIGURE 7 to be aligned with the passage 222. A coil spring 224 disposed in the lower portion of neck 220 constantly biases valve stem 216 upwardly. An adjusting screw 225 is provided for spring 224 at the lower end of neck 220.

*The air pump 26*

Figure 9:
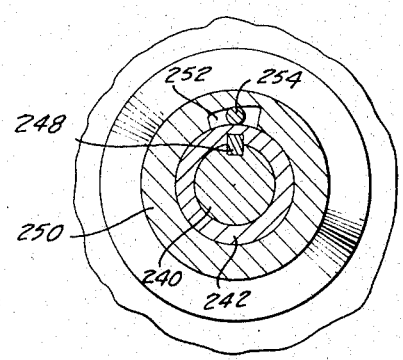
FIGURE 9 is a vertical sectioinal view taken along line 9—9 of FIGURE 8.

Referring particularly to FIG. 8 and FIG. 9, there is shown an air pump 26 which is suitable for use with the system of the present invention. This air pump 26 is driven through a belt 28 by the internal combustion engine of the automotive vehicle whereon the system is installed. The air pump 26 shown is of the centrifugal two-stage type. The first stage chamber 230, is disposed in the forward portion of the pump casing 232. Pressurized air is removed from the outer portion of the first stage 230 by means of a cross-over passage 234 that is in communication with the center of the second stage chamber 236 at the rear portion of the casing 232. A common impeller assembly 238 is provided for both the first and the second stages. The impeller assembly 238 is supported at the rear portion of a shaft 240 by means of suitable bearings.

The front portion of the shaft 240 is keyed to a sleeve 242 which is integral with a flywheel 244. This sleeve 242 is keyed to the shaft 240 by means of a key 248, as shown particularly in FIG. 9. The belt 28 is engaged with a pulley 250 which has a free-wheeling connection relative to the sleeve 242 and hence the impeller shaft 240. As indicated in FIG. 9, such free wheeling may be provided by means of a cam pocket 252 formed in the pulley 250 which cooperates with a roller 254 in a well known manner whereby the sleeve 242 is keyed to the pulley 250 during clockwise rotation thereof, with the sleeve 242 being free to continue rotating upon a drop in the r.p.m. of the shaft 240. The purpose of providing this arrangement is set forth hereinafter.

*The air pressure regulator 34*

As indicated in FIG. 1, the air pressure regulator 34 is interposed in the air line 32 to control the maximum pressure of the air entering the carburetor 30. Referring to FIG. 10, the air line 32 is provided with a plurality of apertures 260 within the confines of regulator 34. These apertures 260 are normally closed by means of an arcuate pressure plate 262. The pressure plate 262 is secured to a vertical post 264 which is in turn slidably supported for vertical movement by a housing 266 which is concentrically arranged around the exterior of the air line 32. The lower portion of the post 264 is slidably mounted within a support disk 268 of the housing 266, while the upper portion thereof is slidably mounted within a bearing 267. A coil compression spring 270 is interposed between a washer 271 that is rigidly affixed to the lower portion of the post 264 and the underside of the air line 32 at this point. The upper portion of the post 264 is secured to a pressure-responsivve diaphragm 274. This diaphragm is secured to an upward extension 276 of the housing 266. The space above the diaphragm 274 is in communication with the pressure of the exhaust gases in exhaust line 22 by means of the conduit 86. A vent 277 is formed in the housing extension 276.

Adjustment nuts 280 are carried by the lower portion of the post 264. With these nuts, the force of the spring 270 is regulated to maintain the pressure plate 262 closed so long as the air pressure being delivered from the air pump 26 remains below a predetermined increment above the pressure of the exhaust gases in line 22 and conduit 86. When the pressure of the air being delivered by the air pump 26 exceeds this predetermined value, the diaphragm 274 and hence the post 264 and pressure plate 262 will move upwardly so as to permit the escape of air from the conduit 32 into the housing 266 by means of apertures 260. Air entering the casing 266 will escape therefrom through the outlet 82.

*The carburetor 30*

Referring now to FIGURES 11 through 14, the carburetor 30 includes a hollow body 290 which is provided at its rear portion with a conventional shut-off fitting 292 that receives the fuel line 40. The fuel entering the body 290 through fitting 292 is received within a float chamber 294. A conventional float 296 is disposed within this chamber 294, the rear portion of such float being pivotally mounted by a horizontal pin 298. The float member 296 includes a cam finger 300 which abuts the front end of the actuator plunger 302 for the shut-off fitting 292, with flow of fuel into the float chamber being shut off when the float assembly 296 reaches its substantially horizontal position of FIGURE 12. This conventional shut-off arrangement for a carburetor is well known to those skilled in the art.

Figure 12:
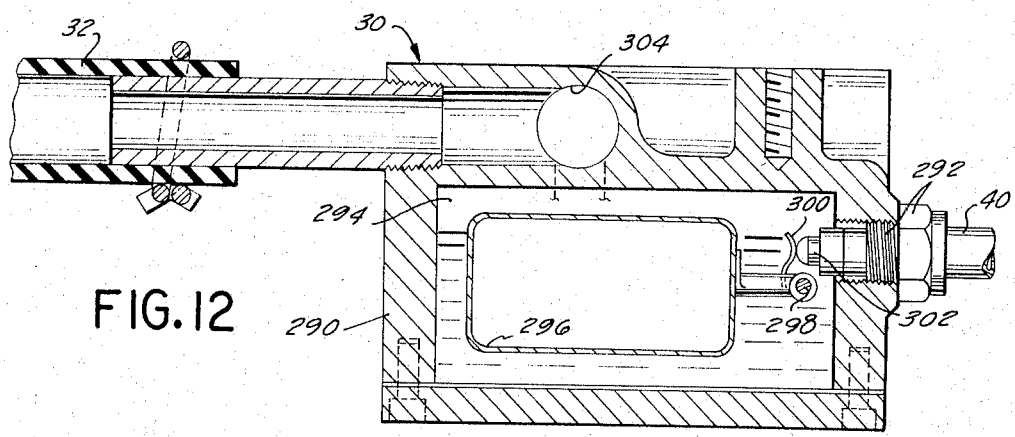
FIGURE 12 is a vertical sectional view taken along line 12—12 of FIGURE 11.
Figure 13:
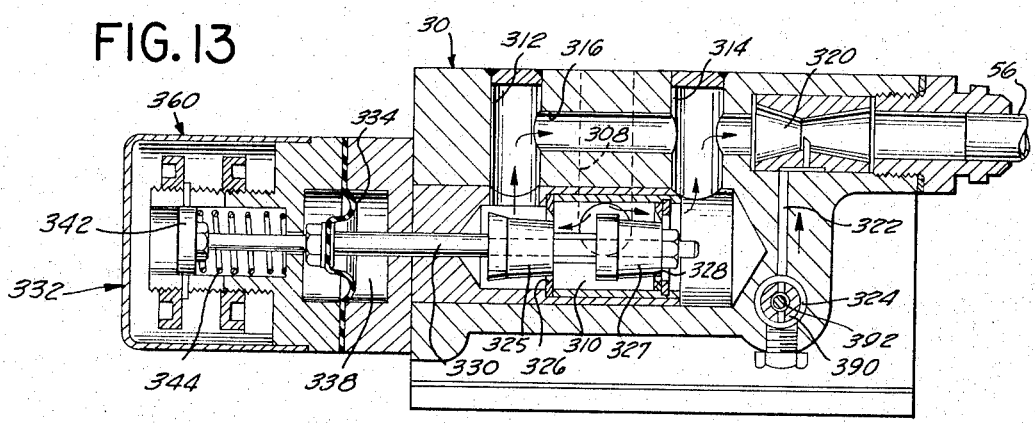
FIGURE 13 is a vertical sectional view taken along line 13—13 of FIGURE 11.

Referring particularly to FIG. 12, air enters the upper front portion of the carburetor 30 through the air conduit 32 and is directed horizontally through a transverse passage 304 and thence downwardly through vertical bores 306 and 308. Referring now to FIG. 13, the air entering vertical bore 308 is directed to a balancing chamber 310. From this balancing chamber 310 the air flows both forwardly and rearwardly and thence upwardly through vertical ducts 312 and 314. The latter ducts are connected by a horizontal duct 316. This air then flows rearwardly through a venturi 320. The throat of the venturi is in communication with the upper end of a vertical passage 322. The lower end of the passage 322 is in communication with a needle valve chamber 324 that receives fuel from the float chamber 294. Accordingly, the air flowing through the venturi 320 aspirates fuel into the venturi throat, with the resulting atomized air-fuel mixture moving rearwardly into the air fuel conduit 56. The flow of air from the balance chamber 310 is effected by tapered front and rear plugs 325 and 327, disposed within tapered ports 326 and 328, respectively, such plugs being secured to a horizontally extending rod 330. Plug 325 and port 326 are so proportioned as to balance the air pressure exerted upon plug 327 and port 328 and prevent the latter from being continually closed.

Movement of the rod 330 is controlled by an air-fuel metering unit, generally designated 332, the details of which are shown in FIG. 13. This unit 332 includes a flexible disphragm 334 that is secured to the rod 330 within the confines of the unit 332. The effective portion of the diaphragm 334 is disposed within a chamber 338. The rear portion of the chamber 338 (right-hand portion in FIG. 13) is in communication with the intake manifold of the internal combustion engine by means of conduit 57, such conduit being shown in FIG. 11. The opposite side of the chamber 338 is vented to atmosphere. The front end of the rod 330 is affixed to a retainer 342 and a coil spring 344 constantly biases the retainer 342 and hence the rod 330 forwardly.

Referring now to FIG. 11, air entering the vertical bore 306 passes through a second balance chamber formed in the opposite side of the carburetor from the balancing chamber 310. This second balance chamber and the contents thereof are similar to the balance chamber 310 and accordingly are not shown in the drawings. Control over the movement of the tapered plugs in the second balance chamber is effected by means of a rod 330. Movement of this rod is effected by means of an air metering unit 345, the parts and operation of which are identical to that described hereinabove in connection with the unit 332, and such like parts bear primed reference numerals in FIGURE 11. From the second balance chamber air flows upwardly through vertical bores 360 and 362 connected by horizontal passage 364. This air flows rearwardly through a rearwardly extension 365 of the passage 364 and out of the carburetor into the upstream air conduit 44. It will be apparent that the rear portion of the passage 364 is not connected in any manner to the fuel dispensing portion of the carburetor 30.

Referring again to FIGURE 11, a branch bore 370 extends to one side from the horizontal air passage 316. This bore is in communication with the secondary air conduit 52. It will be noted that the port 370 is upstream of the venturi 320. Accordingly, no fuel will enter the conduit 52.

Figure 14:
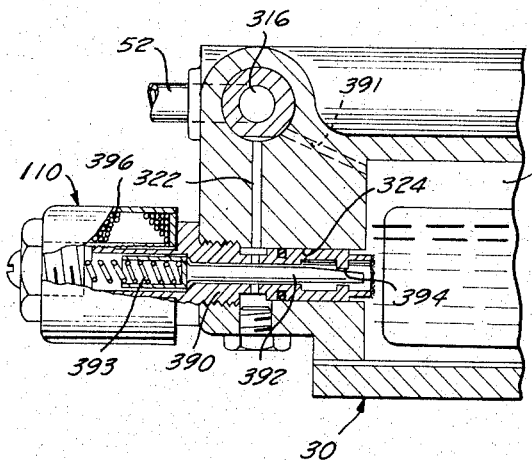
FIGURE 14 is a fragmentary vertical sectional view taken along line 14—14 of FIGURE 11.

With continued referencet o FIGURE 11 and with additional reference to FIGURE 14, the priming valve 110 is affixed to one side of the carburetor 30 by means of an elongated fitting 390, shown particularly in the latter figure. The fitting 390 is disposed in the aforedescribed needle valve chamber 324 and is in communication with the float chamber 294. The float chamber 294 exists at system pressure by virtue of a passage 391 connecting the upper portion of this chamber with the duct 316, as shown in FIG. 14. The fitting 390 supports a conventional needle valve 392. This needle valve 392 is maintained in its normal position of FIGURE 14 by means of a coil compression spring 393. In this normal position the free end of the needle valve 392 is so positioned within an orifice 394 of fitting 390 as to meter a predetermined amount of fuel therethrough. When the solenoid windings 396 of the metering valve 110 are excited the needle valve 392 will be pulled to the left relative to FIGURE 14 so as to admit an additional amount of fuel into the vertical passage 322 and hence into the throat of the venturi 320.

*Operation*

In the operation of the aforedescribed apparatus and with reference first to FIGURE 1, the ignition switch 72 is first tuned to an "on" position. Assume that both the afterburner and the automotive vehicle engine are at this time cold. Accordingly, the heat-sensitive switch 92 will connect the ground lead 98 to the positive lead 104, with the circuit thereby being completed by the positive lead 109 to the automobile battery 76 so as to illuminate the dashboard indicator bulb 94. At the same time, a circuit will be completed through the solenoid of the priming valve 110 through leads 98, 104, 108, 112 and 109 so as to excite the windings 396 thereof. Referring now to FIG. 14, such excitation of the solenoid windings 396 will withdraw the needle valve 392 to the left whereby an excess quantity of fuel may be drawn upward into the carburetor venturi 320. The push button 120 is then manually depressed so as to effect opening of the fuel shut-off valve 42, by directing current through the solenoid windings thereof by means of ground leads 122, 118 and 116, and positive leads 114 and 109. Fuel will then flow into the carburetor 30 so as to supplement the fuel present within the float valve chamber 294. When the push button 120 is released, the fuel shut-off valve 42 will automatically close until the temperature within the afterburner 20 reaches the magnitude required to cause heat-sensitive switch 92 to connect ground lead 98 to lead 100, 119 and 116. When this connection is made the solenoid of the fuel shut-off valve 42 will again be excited so as to maintain this valve open during normal operation of the afterburner 20.

The automobile engine may then be started. When the automobile engine starts, it will drive the air pump 26 so as to direct air through the air pressure regulator valve 34 and safety shut-off valve 36 into the front portion of the carburetor 30. The air pressure regulator valve 34 will be set to deliver air at a pressure of predetermined magnitude, as for example approximately three p.s.i. above atmospheric. The exact pressure will be chosen in accordance with the needs of the system to provide most efficient operation of the afterburner.

With pressurized air entering the carburetor 30, upstream air will be directed through the conduit 44 to the front portion of the afterburner, with the branch conduit 46 simultaneously directing pressurized downstream air into the rear portion of the afterburner. An atomized mixture of air and fuel will flow through the conduit 56 into the pilot burner. When the engine is started the parts of the time-delay valve 54 will be arranged as indicated in FIG. 7. In this position the valve stem 216 blocks flow of air through the air conduit 52. It is desirable to delay the flow of air to the pilot burner 50 until such time as the latter is preheated to the point where the fuel entering through conduit 56 will be converted to a gaseous state. It will be understood that with continued operation of the automobile engine air will enter the upper portion of the housing 210 of the time-delay valve 54 through the metering orifice 218 so as to gradually flex the diaphragm downwardly to align the groove 223 of the valve stem 216 with the passage 222. The air will then be free to flow through conduit 52 into the pilot burner 50.

The spark plug 60 will effect ignition of the air-fuel mixture entering the pilot burner 50 through conduit 56, such mixture being given a spiral flow by its passage through louvers 186 and 188. Fresh air entering through conduit 52 passes longitudinally and circumferentially through air spinner passages 193b so as to impart a spiral flow to the air entering through conduit 52. The fuel-air mixture provides a fuel-rich mixture (reducing flame) at the rear of the pilot burner for easier starting. The fresh air from spinner 193a progressively leans this mixture to provide an oxidizing flame, that is at lower temperature than the reducing flame thereby preventing high temperature destruction of the pilot burner parts while affording optimum burning conditions.

As the temperature within the pilot burner 50 is raised, heat is imparted to the heat-sensing tube 198 of the heat-sensitive switch 92. This switch then operates to cut off the flow of electrical current through lead 104 and instead completes a circuit between ground and positive leads 100, 102 and 109. This will cause the dashboard bulb signal 94 to turn off while the exterior signal bulb 96 is caused to be illuminated. Also, as noted hereinabove, current will flow to the fuel shut-off value 42 whereby it will remain open. As the temperature within the afterburner 20 is raised, the heat-sensitive valve 59 will be open so as to connect the interior of the carburetor with the intake manifold of the engine through conduits 57 and 58.

The air and fuel metering units 332 and 345 serve to admit air and fuel to the afterburner 20 in proportion to the magnitude of the intake manifold vacuum, with the greater the magnitude of such vacuum the less the volume of air and fuel admitted to the afterburner. Thus, with reference to FIGURES 11 and 13, it will be observed that an increase in the magnitude of the intake manifold vacuum will cause the diaphragms 334 and 334' to flex to the right so as to urge the plugs 325, 325' and 327, 327' towards a closed position relative to their respective ports. With this arrangement, the volumes of air and fuel delivered to the afterburner will be automatically decreased during idling and deceleration of the automotive vehicle, as compared to partial to full throttle conditions. This is desirable since during idling and deceleration conditions the exhaust gases contain considerable unburned fuel. Also, the velocity of flow of the exhaust gases through the afterburner is lower during idling and deceleration than during open throttle conditions whereby the residence time of the gases in the afterburner is greater.

The metering plugs 325, 325' and 327, 327' will automatically be maintained in wide open position until the temperature within the afterburner 20 reaches a predetermined magnitude by the temperature responsive valve 59. The latter shuts off communication between the intake manifold and the air and fuel metering units 332 and 345 until the afterburner reaches its operating temperature. Thereafter, the above-described automatic control over the volume of air and fuel delivered to the afterburner becomes effective.

It should be noted that the free-wheeling connection of the impeller shaft 240 and the sleeve 242 of the air pump 26 provides the carburetor with air should the engine be suddenly slowed to an idle speed while the intake manifold and exhaust line 22 are heavily saturated with fuel, e.g. after the engine has been operated at a high load condition and at high speed. Such air is provided because the impeller assembly 238 will continue to rotate at a high speed after the impeller shaft 240 slows down.

Should one or more of the spark plugs of the engine become inoperative and cause the afterburner to receive an excess of fuel from the engine through exhaust line 22, it is desirable to stop the flow of air to the carburetor 30 so as to prevent further heating within the afterburner. This function is obtained by the air shutoff valve 36. Thus, the heat-responsive switch 91 disposed in the front portion of the afterburner will close a circuit through the solenoid windings 89 of the valve 36 by means of leads 90, 91, 73 and 109 when the temperature within the afterburner exceeds a predetermined maximum. The solenoid 89 will then move the butterfly element 37 to a closed position so as to block flow of air through conduit 32. With air so blocked the temperature within the afterburner will drop and thereby cause the heat-responsive switch 92 to illuminate the dashboard-located signal lamp 96 while the exterior located signal lamp 94 goes out. In this manner the motorist will be made aware of a malfunction.

Referring to FIGURES 15 through 18, there is shown a second form of air safety shut-off valve arrangement which may be utilized with the system of the present invention. In these figures elements corresponding to the elements shown and described in FIGURES 1 through 14 bear primed reference numerals. Thus, in FIGURE 15 there is shown a fresh air conduit 32' which supplies air to the carburetor 30' from an air pressure regulator valve 34'.

During normal operation of the afterburner system ther will be a free flow of air through the conduit 32'. An air shut-off valve 36' shown in detail in FIGURE 18 is provided to stop the flow of air to the carburetor 30' should the temperature within the afterburner 20' exceed a predetermined maximum. The air shut-off valve 36 is of the butterfly type and normally will be disposed in its horizontal position of FIGURE 18. When the flow of air through the conduit 32' is to be stopped, the shut-off valve 36' will be pivoted out of its horizontal position towards a vertical position by an actuator shown particularly in FIGURE 16 and generally designated 399. A crank arm 400 has one end keyed to a horizontal shaft 402 that supports the shut-off valve 36' and its opposite end pivotally connected to the lower end of a vertical rod 404 of the actuator 399. The upper end of the rod 404 is formed with a head 406 that is rigidly secured to the central portion of a flexible diaphragm 408 disposed within a generally cylindrical housing 410. A coil compression spring 412 normally biases the rod 404 downwardly to its position shown in FIGURES 16 and 18. The interior of the housing 410 is in communication with a conduit 414.

Operation of the actuator 399 is controlled by a temperature-sensing unit generally designated 415 shown particularly in FIGURES 15 and 17. Referring to these figures it will be observed that the opposite end of the conduit 414 is in communication with the interior of a housing member 416 of unit 415. The housing 416 is secured to the front end of the afterburner 20'. The interior of this housing 416 is also in communication with the intake manifold of the engine by means of a conduit 418.

As indicated in FIGURE 17, the rear end of the housing 416 is formed with a threaded fitting 420 which screws into the front of the afterburner 20'. A metal tube 422 is secured to the rear end of the fitting 420 and extends through the front portion of the afterburner and into the front end of the burning chamber 152. A temperature insensitive quartz rod 424 is disposed within the metal tube 422. The front end of this rod 424 abuts the rear surface of a fulcrum member 426 at the intermediate portion of such fulcrum member. Above the point of engagement of the front end of rod 424 with the fulcrum member 426, the fulcrum member is formed with a convex fulcrum surface 428 which is retained against a complementary concave fulcrum surface 430 formed at the intermediate portion of a bracket 432 by means of an anchor pin 434, such anchor pin extending through aligned horizontal bores formed in the fulcrum member 426 and the bracket 432. A coil compression spring 436 is interposed between the rear surface of the brackets 432 and a retainer 440 formed at the rear end of the anchor pin 434.

The lower portion of the fulcrum member 426 abuts the rear end of a metering valve 440 which is carried by a valve block 442 disposed within the lower portion of the housing 416. The metering valve 440 controls fluid flow through a passage 444 formed in the valve block 442. A coil compression spring 446 constantly biases the metering pin 440 to the rear, i.e. towards an open position. The front wall of the housing 416 is provided with an adjustment screw unit 448 for properly positioning the upper portion of the bracket 432, such bracket being formed of a suitable flexible material.

During normal operation of the afterburner system, the parts of the above-described sensing unit 415 will be arranged as shown in FIGURE 17. Should the temperature within the afterburner exceed a predetermined maximum, the metal tube 442 will expand towards the rear of the afterburner, i.e. towards the right in FIGURE 17. Since the rod 424 is temperature insensitive so far as thermal expansion and contraction is concerned, its length will remain the same. Accordingly, the rod 424 and metering valve 440 will be free to move towards the right in FIGURE 17 under the influence of the spring 446. This will effect opening of the metering valve 440 whereby communication will be established between the interior of the housing 416 and the conduit 418. In this manner, conduit 414 and the interior of housing 410 of actuator 339 will be placed in communication with the intake manifold vacuum. This will cause the diaphragm 408 to flex upwardly whereby the rod 404 will pivot the air shut-off valve 36' towards a closed position so as to block the flow of air through the conduit 32'. With air so blocked, the temperature within the afterburner 20' will drop to a safe level. A vent 450 is provided at one side of the housing 410 to permit the diaphragm 408 to return to its normal position after the malfunction is corrected.

It should be particularly noted that it is possible to connect the conduit 418 to the conduit 32 rather than to the intake manifold of the engine, and then connect conduit 414 with the housing 410 below diaphragm 408. With this arrangement, the effect of the spring 412 would also have to be reversed. Such a modification would also serve to effect proper actuation of the shut-off valve 36'.

Various modifications and changes may be made with regard to the foregoing detailed description without departing from the spirit of the invention or the scope of the following claims.

I claim:
1. An afterburner system for treating the exhaust gases issuing from the internal combustion engine of an automotive vehicle, comprising:
   an afterburner;
   an air pump actuated by said engine;
   fuel supply means;
   a carburetor that receives air from said air pump and fuel from said fuel supply means, said carburetor having air and fuel metering means arranged to provide air and fuel to said afterburner responsive to the operating conditions of said engine;
   conduit means connecting said air and fuel metering means and said afterburner to deliver air and fuel to said afterburner;
   and a heat-responsive member operatively interconnecting said afterburner and said carburetor to maintain said air and fuel metering means in a wide open position until the temperature within said afterburner exceeds a predetermined value, said air and fuel metering means thereafter operating to provide air and fuel to said afterburner solely responsive to the operating conditions of said engine independently of said heat-responsive member.

2. An afterburner system for treating the exhaust gases issuing from the internal combustion engine of an automotive vehicle, comprising:
   an afterburner;
   an air pump actuated by said engine;
   fuel supply means;
   a carburetor that receives air from said air pump and fuel from said fuel supply means, said carburetor having air and fuel metering means arranged to provide air and fuel to said afterburner responsive to the operating conditions of said engine;
   conduit means connecting said carburetor and said afterburner to deliver air and fuel to said afterburner;
   a heat-responsive member operatively interconnecting said afterburner and said carburetor to maintain said air and fuel metering means in a wide open position until the temperature within said afterburner exceeds a predetermined value, said air and fuel metering means thereafter operating to provide air and fuel to said afterburner solely responsive to the operating conditions of said engine independently of said heat-responsive member;
   an air shut-off valve interposed between said air pump and said carburetor;
   and heat-responsive means operatively interconnecting said afterburner and said air shut-off valve to close said air shut-off valve when the temperature within said afterburner exceeds a predetermined magnitude.

3. An afterburner system for treating the exhaust gases issuing from the internal combustion engine of an automotive vehicle, comprising:
   an afterburner;
   an air pump actuated by said engine;
   fuel supply means;
   a carburetor having air and fuel metering means arranged to provide air from said air pump and fuel from said fuel supply means to said afterburner responsive to the operating conditions of said engine;
   conduit means connecting said air and fuel metering means and said afterburner to deliver air and fuel to said afterburner;
   a priming valve on said carburetor that when actuated admits an excess quantity of fuel to said conduit means;
   and temperature-responsive means connected to said afterburner that effects actuation of said priming valve until the temperature within said afterburner exceeds a predetermined value, said air and fuel metering means thereafter operating to provide air and fuel to said afterburner solely responsive to the operating conditions of said engine independently of said heat-responsive member.

4. An afterburner system for treating the exhaust gases issuing from the internal combustion engine of an automotive vehicle, comprising:
an afterburner;
an air pump actuated by said engine;
fuel supply means;
a carburetor that receives air from said air pump and fuel from said fuel supply means, said carburetor having air and fuel metering means arranged to provide air and fuel to said afterburner responsive to the operating conditions of said engine;
conduit means connecting said carburetor and said afterburner to deliver air and fuel to said afterburner;
a heat-responsive member operatively interconnecting said afterburner and said carburetor to maintain said air and fuel metering means in a wide open position until the temperature within said afterburner exceeds a predetermined value, said air and fuel metering means thereafter operating to provide air and fuel to said afterburner solely responsive to the operating conditions of said engine independently of said heat-responsive member;
a priming valve on said carburetor that when actuated admits an excess quantity of fuel to said conduit means;
and temperature-responsive means connected to said afterburner that effects actuation of said priming valve until the temperature within said afterburner exceeds a predetermined value.

5. An afterburner system for treating the exhaust gases issuing from the internal combustion engine of an automotive vehicle, comprising:
afterburner housing means having a neck that receives a mixture of said exhaust gases and air;
a cylinder within said housing means;
heat exchange tubes behind said cylinder within the rear portion of said housing means, with said mixture flowing rearwardly over the exterior of said housing and said tubes;
a flame barrel extending through said cylinder, with said mixture reversing direction and flowing forwardly through said flame barrel after passing over the exterior of said cylinder and heat exchange tubes, said mixture then flowing out of the front of said flame barrel and again reversing direction to pass through the interior of said cylinder and said heat exchange tubes;
a pilot burner in the rear of said housing means;
means for providing air and fuel to said pilot burner to maintain a flame that is directed forwardly into the rear of said flame barrel to ignite said mixture within said flame barrel;
means for directing air to the interior of said housing downstream of said pilot burner;
and means downstream of the interior of said heat exchange tubes for discharging said mixture from said housing means.

6. An afterburner system for treating the exhaust gases issuing from the internal combustion engine of an automotive vehicle, comprising:
an afterburner;
an exterior signal lamp;
a dashboard signal lamp;
a heat-responsive electrical switch on said afterburner;
and electric circuit means interconnecting said lamps and said switch whereby said lamps will be selectively illuminated responsive to the temperature within said afterburner.

7. An afterburner system for treating the exhaust gases issuing from the internal combustion engine of an automotive vehicle, comprising:
an afterburner;
an exterior signal lamp;
a dashboard signal lamp;
a heat-responsive electrical switch on said afterburner;
and electric circuit means interconnecting said lamps and said switch whereby solely said exterior lamp will be illuminated when the temperature within said afterburner exceeds a predetermined value and solely said dashboard lamp will be illuminated when said temperature is below said predetermined value.

8. An afterburner system for treating the exhaust gases issuing from the internal combusion engine of an automotive vehicle, comprising:
an afterburner;
an exterior signal lamp;
a dashboard signal lamp;
a heat-responsive electrical switch on said afterburner;
a carburetor that supplies air and fuel to said afterburner;
fuel supply means for said carburetor including a shut-off valve that is normally closed, but which is caused to open when electric current is directed thereto;
a manually-operated electrical switch;
and electric circuit means interconnecting said lamps, said shut-off valve and said switches whereby actuation of said manually-operated switch will effect an initial opening of said shut-off valve, with said heat-responsive switch maintaining said shut-off valve open after the temperature within said afterburner is raised above a predetermined value, and said lamps will be seletcively illuminated under the control of said heat-responsive switch responsive to the temperature within said afterburner.

9. An afterburner system for treating the exhaust gases issuing from the internal combustion engine of an automotive vehicle, comprising:
an afterburner;
an exterior lamp;
a dashboard lamp;
a heat-responsive electrical switch on said afterburner;
a carburetor that supplies air and fuel to said afterburner;
fuel supply means for said carburetor including a shut-off valve that is normally closed, but which is caused to open when electric current is directed thereto;
a manually operated electrical switch;
a priming valve on said carburetor that when electrically actuated admits a priming charge of fuel to said carburetor;
a source of electric current;
a first electric circuit to connect said heat-responsive switch, said dashboard signal lamp and said priming valve with said source of electric current;
and a second electric circuit to connect said switches, said fuel shut-off valve and said exterior signal lamp with said source whereby said heat-responsive switch will connect solely said dashboard lamp and said priming valve with said source until the temperature of said afterburner reaches a pre-determined value whereafter said heat-responsive switch cuts off the flow of electric current to said dashboard lamp and said priming valve and connects said exterior lamp and said shut-off valve with said source, whereby actuation of said manually-operated switch will effect an initial opening of said shut-off valve, with said heat-responsive switch maintaining said shut-off valve open after the temperature within said afterburner is raised above a predetermined value.

10. An afterburner system for treating the exhaust gases issuing from the internal combustion engine of an automotive vehicle, comprising:
an air pump actuated by said engine;
a fuel supply means;
a carburetor that receives air from said air pump and fuel from said fuel supply means;
an afterburner having a burning chamber that receives said exhaust gases;
a pilot burner on said afterburner that effects ignition within said burning chamber;
first means to deliver air from said carburetor to said pilot burner;
second means to deliver air and fuel from said carburetor to said pilot burner;
and timer means that delay the flow of air through said first means until said pilot burner is heated to a predetermined temperature.

11. An afterburner system for treating the exhaust gases issuing from the internal combustion engine of an automotive vehicle, comprising:
an air pump actuated by said engine;
fuel supply means;
a carburetor that receives air from said air pump and fuel from said fuel supply means, said carburetor having air and fuel metering means that control the amount of air and fuel delivered by said carburetor responsive to the intake manifold pressure of said engine;
an afterburner having a burning chamber that receives said exhaust gases;
a pilot burner on said afterburner that effects ignition within said burning chamber;
first means to deliver air from said carburetor to said pilot burner;
second means to deliver air and fuel from said carburetor to said pilot burner;
timer means that delay the flow of air through said first means until said pilot burner is heated to a predetermined temperature;
second conduit means connecting said carburetor with the intake manifold of said engine;
and a heat-responsive member that blocks said second conduit means until the temperature within said afterburner exceeds a predetermined value.

References Cited

UNITED STATES PATENTS

| | | | |
|---|---|---|---|
| 1,583,621 | 5/1926 | Steinberg | 60—30 X |
| 1,847,506 | 3/1932 | White | 60—30 |
| 1,848,990 | 3/1932 | Boyd et al. | 60—30 X |
| 1,875,024 | 8/1932 | Kryzanowsky | 60—30 X |
| 2,037,692 | 4/1936 | Barr et al. | |
| 2,806,346 | 9/1957 | Clayton | 60—30 |
| 2,807,930 | 10/1957 | Bratton | 60—30 |
| 2,851,852 | 9/1958 | Cornelius | 60—30 |
| 2,937,490 | 5/1960 | Calvert | 60—30 |
| 2,953,898 | 9/1960 | Cornelius | 60—30 |
| 2,956,865 | 10/1960 | Williams | 60—30 X |
| 3,034,290 | 5/1962 | Gary | 60—30 |
| 3,042,499 | 7/1962 | Williams | 60—30 |
| 3,073,684 | 1/1963 | Williams | 60—30 X |
| 3,086,353 | 4/1963 | Ridgway | 60—30 |
| 3,106,820 | 10/1963 | Schaffer et al. | 60—30 |
| 3,131,553 | 5/1964 | Vandenberg | 60—30 |

RALPH D. BLAKESLEE, *Primary Examiner.*

EDGAR W. GEOGHEGAN, SAMUEL LEVIN, MARK NEWMAN, *Examiners.*

A. S. ROSEN, *Assistant Examiner.*